Feb. 19, 1924.  1,484,063
G. E. DICKSON
DEVICE FOR USE IN ISSUING PREMIUM INSURANCE
Filed June 21, 1920
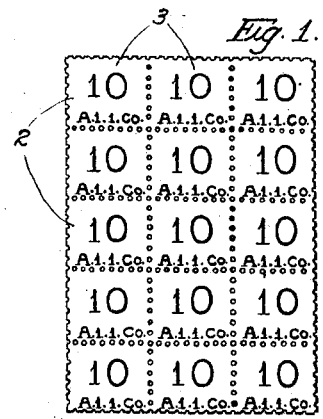
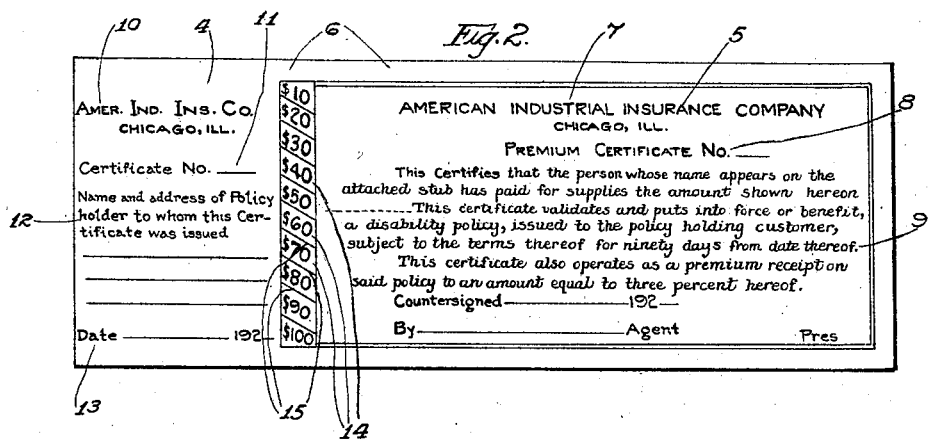
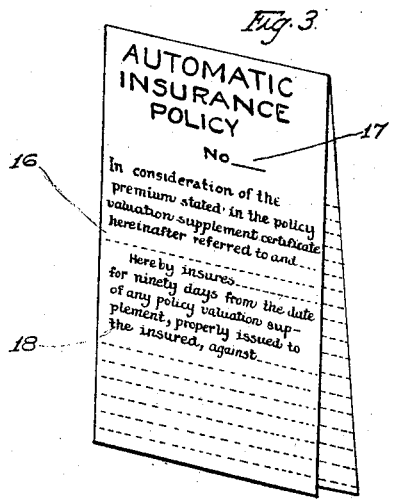
Inventor.
George E. Dickson.
By
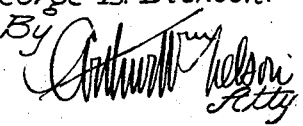

Patented Feb. 19, 1924.

1,484,063

UNITED STATES PATENT OFFICE.

GEORGE E. DICKSON, OF CHICAGO, ILLINOIS.

DEVICE FOR USE IN ISSUING PREMIUM INSURANCE.

Application filed June 21, 1920. Serial No. 390,613.

*To all whom it may concern:*

Be it known that I, GEORGE E. DICKSON, a citizen of the United States, and a resident of Chicago, county of Cook, and State of Illinois, have invented certain new and useful Improvements in Devices for Use in Issuing Premium Insurance, of which the following is a specification.

My invention relates generally to devices for stimulating trade through the medium of premiums, and has especial reference to devices whereby disability or other insurance may be issued as a premium. Numerous premium plans have been devised as a means of stimulating or increasing the patronage and it is to this general class that my invention relates.

It also relates to means for providing insurance to persons having money transactions with others generally.

The general object of my invention is to provide premium giving means which shall act as a strong inducement to purchase merchandise from the merchant using such means, and a particular object of my invention is to provide a practicable method and means whereby insurance may be provided as a premium and whereby the amount of such insurance shall be governed by the amount of goods purchased, within certain fixed time limits, from merchants utilizing this system or method.

It is also an object of my invention to provide means whereby insurance may be provided for persons that have money transactions with others, the insurance value being fixed from time to time in relation to said money transactions.

My invention consists generally in devices of the form, arrangement and construction, whereby the above named objects, together with others that will appear hereinafter are attainable; and my invention will be more readily understood by reference to the accompanying drawings which illustrate the preferred form thereof.

In said drawings:

Fig. 1, is a view of certain token devices embodying my invention.

Fig. 2, is a view of a policy valuation supplement certificate device embodying my invention; and Fig. 3 is a perspective view of an automatic diasability insurance policy embodying my invention.

In Fig. 1, I have shown a plurality of similar devices 2, which bear upon their faces printed matter 3 which in substance indicates that the holder has purchased merchandise to the amount named, say ten cents; and that they are redeemable by the A—— I—— Insurance Co. These devices will, for convenience, be termed tokens hereinafter.

In Fig. 2, I have shown what I shall term hereafter a "policy valuation supplement certificate." The policy valuation supplement certificate as here shown comprises three main parts to wit stub portion, 4, spaced portion 5, and intermediate portion 6. The portion 5 contains the name of an insurance company, 7, a place for the number of the policy valuation supplement certificate as indicated at 8, and certain printed matter thereon as indicated at 9. The printed matter 9, may vary to a considerable extent but it will generally include a statement of which the following is an example:

"This certifies that the person whose name appears on the stub from which this certificate was detached, and who is insured under a certain automatic disability policy heretofore issued by this company, has paid for household supplies and other current living expenses the amount shown hereon.

This certificate validates and puts in force or in benefits, the said automatic disability policy, subject to the terms and conditions thereof, for a period of ninety days from midnight of the day following the date of this certificate.

This certificate also operates as a premium receipt on said automatic disability policy to an amount equal to three per cent of the amount expended as shown hereon. Not more than thirteen validating certificates shall be valid in connection with an automatic disability policy at the same time."

The portion 5 also contains a place for the signature of the president of the insurance company and other places for necessary dates and counter signatures.

The stub portion 4 contains the name of the insurance company as at 10, the number of the policy valuation supplement certificate as at 11, and a place for the name and address of the policy holder to whom the certificate is issued as at 12, and a place for the date as at 13.

The portion 6, intermediate the portions 4 and 5 and connecting them, is composed of a plurality of strip portions 14 arranged vertically for separation along the lines 15. Each of the strip portions 14 contains a value mark, as for example $10.00 and the successive strips contain progressively increasing amounts, as for example, $20, $30, etc.

In Fig. 3, 16 represents what I term an "automatic insurance policy" which bears a number as at 17 and printed matter 18 thereon which defines fully the insurance risk which is assumed by the insurance company.

The interrelational functioning of the devices will be best understood by one or more concrete examples.

The tokens 2 are sold to various merchants such as grocers, furniture dealers, meat markets, etc., etc., for a relatively small sum, being such amount as the merchant can well afford to expend for the purpose of procuring and holding customers who need his merchandise. The insurance company selling tokens 2, solicits prospective customers which for the sake of a convenient term will hereinafter be called "policy holding customers" and sells them automatic insurance policy 16 for a small sum. This sum is such as will merely cover the actual expense of such solicitation. At the same time the insurance company's agent furnishes insurance policy customers with a list of all merchants who give tokens 2, in connection with the purchase of merchandise. In order to secure the benefits of automatic insurance policy, policy holding customers purchase merchandise from merchants enumerated on the furnished list and secure tokens 2, to the face value of the amount of goods purchased from time to time. These tokens, in accordance with the terms of automatic insurance policy, may be used to pay the premium thereon. This is accomplished by simply taking or sending tokens to the insurance company which thereupon issues a premium certificate, i. e. portion 5 thereon with an adhering portion 14, the highest amount of which corresponds to the face value of the tokens presented. Upon the issuance of this policy valuation supplement certificate device to the policy holding customer the automatic insurance policy is put into force or benefits as required by the interreferring terms upon the respective devices. The policy holding customer exchanges tokens from time to time for these policy valuation supplement certificate devices and will ordinarily exchange tokens for policy valuation supplement certificate devices every month although they may be exchanged oftener if desired. By the terms of the devices a given policy valuation supplement certificate device places the policy in force for a period of ninety days. Thus if the tokens are exchanged once a week for policy valuation supplement certificate devices the policy holding customer would have thirteen policy valuation supplement certificates on hand before any of them would expire. If on the other hand the policy holding customer exchanged the tokens but once a month three unexpired policy valuation supplement certificates would be on hand, and these would show the exact amount that the policy holding customer had spent during the ninety day period. Assuming that the policy holding customer continued to purchase from merchants using these devices new policy valuation supplement certificates would constantly be added to take the place of those expiring from time to time.

As a further concrete example of the efficiency of these devices and this method, I might state that if the unexpired policy valuation supplement certificates showed that the policy holding customer had spent during ninety days a total of $225.00 he would receive one-third of this total or $75.00 per month during disability not exceeding two years. If the disability continued for two years the policy holding customer would receive a total of $1800.00. In case the accident was fatal the policy holding customer's family would receive ten times one months indemnity in cash which under the situation assumed would amount to $750.00. This example of insurance risk has been very carefully determined and is one which under this system, the insurance company, for the modest sum received for the tokens, could afford to carry. The full import of this will readily be understood by any one familiar with insurance problems.

An important aspect of the invention resides in the fact that the benefits are fixed automatically at the average monthly amounts the policy holding customer pays for household and personal supplies and if the sum be larger or smaller than the illustration above used the monthly benefits would be increased or diminished accordingly. Thus it becomes apparent that as prices increase and it becomes necessary that the insurance benefits should be larger they are automatically made larger because of the greater amount of money which is expended at such times. Conversely if prices are on the decrease and the amount of insurance needed is not so great, the insurance derived is automatically reduced because of the lesser amount of money which is expended at such times of declining or low price levels.

The devices and the method employed are simple, scientific, and efficient and provide an arrangement under which the merchant, the policy holding customer, and the insurance company are all benefited, but particularly the policy holding customer because of the large amount of insurance which this method provides relative to the premiums paid. In other words, under other methods of insurance placement the acquisition cost will average 50% of the premium paid while under this method the acquisition cost can be held down to 10% and will rarely exceed 15%.

The difference between applicant's 10% acquisition cost and the prevailing 50% acquisition cost can be and will be used to furnish great additional indemnity without increasing the premium cost, or conversely, the same indemnity can be furnished by greatly reducing the premium cost. The economic import of this statement and its advantage to the public are difficult to overstate.

While the example of the use of devices before given refers to a situation where the policy is put into force and the value automatically determined from time to time by the so called premium certificates, which are in effect policy valuation supplements, and which have been issued in conjunction with tokens given by merchants, it should be understood that the devices may have other uses, between persons having money transactions one with the other, so that the example given should be considered as by way of illustration and not by way of limitation.

I claim:—

1. The device herein described embodying an insurance policy device which is substantially valueless until its value is fixed by a policy valuation supplement and having an inscription thereon which is but partly definitive of the risk to be assumed by the insurance company and the benefits to be extended to the insured in that it does not fix the amount of the indemnity payable, and a policy valuation supplement device having a statement inscribed thereon which supplements the inscription on the insurance policy device, the said statement completing the partial statement of the risk assumed by the insurance company and the benefits extended to the insured that is partly stated on the insurance policy device, one of said devices bearing an inscription indicating that the insurance policy is validated and put into force when the policy valuation supplement is issued by the consent of the insurance company to the policy holding customer.

2. The device herein described embodying an insurance policy device which is substantially valueless until its value is fixed by the policy valuation supplements and having an inscription thereon which is but partly definitive of the risk to be assumed by the insurance company and the benefits to be extended to the insured in that it does not fix the amount of the indemnity payable, and a plurality of policy valuation supplement devices, each having an inscription thereon limiting its effective life so that they expire at different times, the said inscriptions completing the partial statement of the risk to be assumed by the insurance company and the benefits to be extended to the insured that is partly stated on the insurance policy device, said plurality of policy valuation supplement devices simultaneously coacting to fix the amount of indemnities payable under the insurance policy at any given time, one of said devices bearing an inscription indicating that the insurance policy is validated and put into force when the policy valuation supplement is issued by the consent of the insurance company to the policy holding customer.

In testimony whereof, I have hereunto set my hand, this 16th day of June, 1920.

GEORGE E. DICKSON.